United States Patent [19]

Itoh et al.

[11] Patent Number: 4,487,482
[45] Date of Patent: Dec. 11, 1984

[54] STOP DOWN STRUCTURE FOR FACSIMILE ZOOM LENS

[75] Inventors: Takayuki Itoh; Yoshihiro Hama, both of Tokyo, Japan

[73] Assignee: Asahi Kogaku Kogyo Kabushiki Kaisha, Tokyo, Japan

[21] Appl. No.: 315,562

[22] Filed: Oct. 27, 1981

[30] Foreign Application Priority Data

Oct. 28, 1980 [JP] Japan .................. 55/151045

[51] Int. Cl.³ .................. G02B 15/16; G02B 13/24; H04N 1/04
[52] U.S. Cl. .................. 350/429; 350/450; 358/294
[58] Field of Search .............. 350/429, 430, 448, 450, 350/449; 358/294, 228

[56] References Cited

U.S. PATENT DOCUMENTS

| 3,566,965 | 3/1971 | Nagashima | 350/450 |
|---|---|---|---|
| 3,889,282 | 6/1975 | Hashimoto | 354/196 |
| 3,906,529 | 9/1975 | Filipovich | 350/429 |
| 4,149,775 | 4/1979 | Blake | 350/429 |
| 4,159,864 | 7/1979 | Yasukuni et al. | 350/450 |
| 4,273,414 | 6/1981 | Shimojima | 350/449 |

FOREIGN PATENT DOCUMENTS

| 33494 | 10/1971 | Japan | 350/429 |
|---|---|---|---|
| 2154084 | 5/1972 | Japan | 350/255 |
| 640233 | 2/1979 | U.S.S.R. | 350/429 |
| 651291 | 3/1979 | U.S.S.R. | 350/429 |

Primary Examiner—Jon W. Henry
Attorney, Agent, or Firm—Sughrue, Mion, Zinn, Macpeak & Seas

[57] ABSTRACT

A diaphragm is mounted for axial movement with the rear lens group in the zoom lens of a facsimile apparatus, and a closing ring axially movable with the rear lens group is rotatable via camming surfaces in a surrounding cylinder to close or open the aperture in accordance with the lens group axial movement.

5 Claims, 3 Drawing Figures

STOP DOWN STRUCTURE FOR FACSIMILE ZOOM LENS

BACKGROUND OF THE INVENTION

This invention is directed to a variable image magnification line scanning-type facsimile in which optical data from a different size original are converted into video signals by a line sensor which are then delivered to a transmitting circuit, and wherein the image size of the original is changed without varying the number of scanning lines which affects the resolution or image quality.

In such an apparatus, a fixed focus lens is generally employed, and the lens or a line sensor is moved to change the distance between an object and its image, to thereby carry out a magnification variation. Alternatively, the focal length of an image forming lens is changed to carry out a magnification variation without changing the distance between an object and its image. In one example of a construction for changing the focal length, a plurality of fixed focus lenses are provided on a disk. That is, a turret type construction is employed in which fixed focus lenses are switched according to the image sizes. In another example, the focal length is varied with a single zoom lens.

In a system wherein the magnification variation is carried out with a fixed focus lens, and wherein the distance between an object is fixed, the line sensor must be moved substantially. Therefore, this method suffers from a problem that in order to make constant the quantity of light received by the line sensor the aperture diameter must be increased or decreased in association with the movement of the line sensor.

In the turret type construction, the disk holding the plurality of fixed focus lenses is turned to switch the lenses to thereby change the focal length. Because of the characteristics of the line sensor, by controlling the quantity of light of the image to a fixed suitable value, the operation range of output of the line sensor can be increased, and accordingly a high contrast video signal can be obtained. Therefore, the numerical aperture of each lens is fixed to a constant value so that the output energy of the line sensor is made constant. However, in the case where the distance between an object and its image is made constant for each of the lenses, it is difficult to obtain a predetermined magnification.

In a facsimile apparatus 100 using the zoom system, as shown in FIG. 4, a single zoom lens 102 is used to continuously change the focal length without changing the distance between the object, or document, 104 and the image formed at the line sensor 106, to thereby change the image size, and therefore a predetermined magnification can be readily obtained. Similarly as in the case of a fixed focus lens, it is necessary to increase or decrease the aperture diameter, in order to make the output energy of the line sensor 106 constant.

SUMMARY OF THE INVENTION

It is an object of this invention to provide a line scanning type facsimile system wherein a zoom lens is used and wherein the line sensor illumination energy can be maintained constant by a simple mechanism.

According to this invention, the aperture diameter is increased or decreased in association with the movement of the lens group relative to the lens barrel independently of the line sensor, and the necessary amount of movement is small. Therefore, the output energy of the line sensor can be made constant by a relatively simple construction.

An important feature of this invention resides in that, in a zoom system using a line scanning type facsimile zoom lens, in order to apply a constant optical energy to the line sensor the aperture diameter is changed in association with the zooming operation to correct the variation in numerical aperture due to the zooming operation, to thereby make the output energy of the line sensor constant.

The means for controlling the lens aperture comprises a multi-blade diaphragm, preferably in the vicinity of the rear lens group of the zoom lens. The diaphragm is opened and closed by rotation of a closing ring which, in turn, is rotated in response to axial movement of the rear lens group via rollers integral with the ring and camming grooves which are angularly oriented with respect to the optical axis of the lens system.

BRIEF DESCRIPTION OF THE DRAWIINGS

DETAILED DESCRIPTION OF THE INVENTION

One embodiment of this invention will be described with reference to the accompanying drawings. More specifically, the embodiment is described with reference to a so-called two-group type zoom lens having two movable lens groups, which has the simplest arrangement among the zoom lenses. The invention relates to a stop operating structure for a lens system having a stop in the rear group of lenses capable of varying the magnification.

Figure 1:
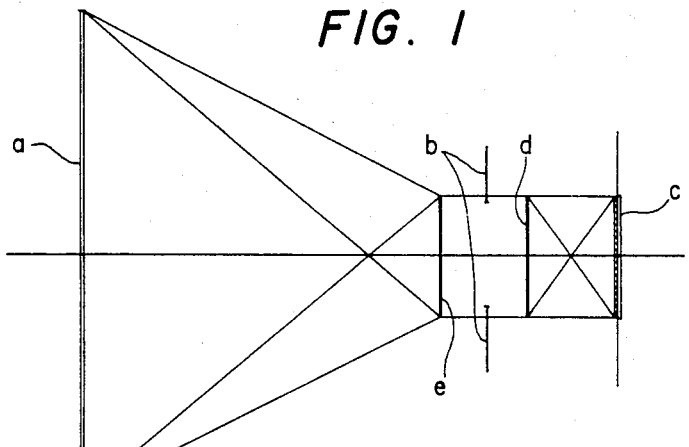
FIG. 1 is a schematic diagram showing the optical system of a variable image magnification line scanning system which employs a zoom lens.

FIG. 1 is a schematic diagram showing the optical system of a variable image magnification line scanning system facsimile. An object a is such that the image size is changed according to an original to be transmitted. A line sensor c is constituted by minute light receiving elements arranged in a line. The minute light receiving elements are adapted to convert the optical intensity of an image formed by the optical system into an electrical signal. The range of use of the line sensor c, i.e. the amount of the overall line sensor which is used, remains unchanged even if the image size is changed. The distance between the object a and the line sensor c also remains constant even when the image size is changed.

A stop b is provided to make the output energy of the line sensor constant in the zooming range. An entrance pupil e is the image of the stop b which is formed by the optical system on the optical entrance side. An exit pupil d is the image of the stop b which is formed by the optical system on the optical exit side.

Figure 2:
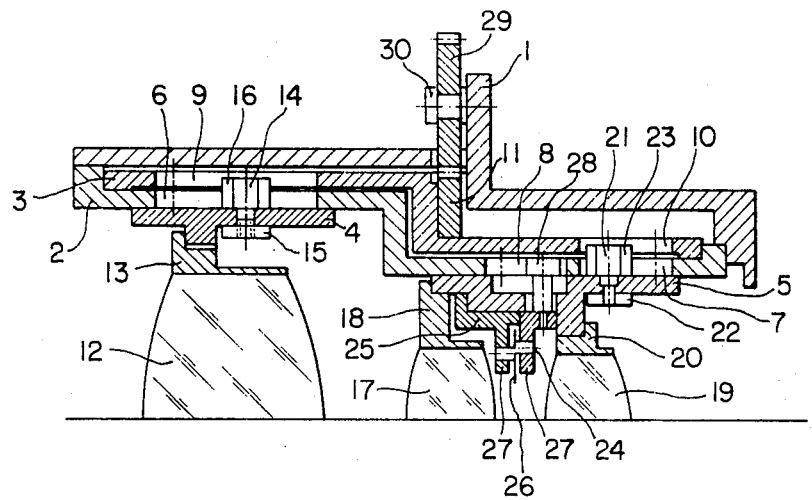
FIG. 2 is a sectional side view of a zoom lens section according to this invention.

FIG. 2 is a sectional side view of a portion of a zoom lens section. A lens barrel body 1 is secured to a facsimile body (not shown) and supports an outer cylinder 2. A gear shaft 30 is embedded in the flange of the lens barrel body 1 in such a manner that it is in parallel with the optical axis. The outer cylinder 2 is held by the lens barrel body 1 at both ends. A drive ring 3 is rotatably placed on the outer wall of the outer cylinder 2, but its movement in the direction of the optical axis is inhibited. The inner wall of the outer cylinder 2 is divided into a first inner wall larger in diameter and a second inner wall smaller in diameter. A front group moving frame 4 is slidably fitted in the larger diameter first inner wall, while a rear group moving frame 5 is slidably fitted in the smaller diameter second inner wall. Two front group straight grooves 6 are formed in the front part of the outer cylinder 2, which is larger in diameter, in such a manner that they are diagonally (180°) opposite to each other, i.e. one is shown in FIG. 2 while the other is directly opposite in the lower half of the lens system (not shown). Two rear group straight grooves 7 are formed in the rear part of the outer cylinder, which is smaller in diameter, in such a manner that they are diagonally (180°) opposite to each other. An aperture-diameter-correcting cam groove 8 is formed in the rear part. The drive ring 3 is rotatably placed over the outer cylinder 2, and has front group moving cam grooves 9 and rear group moving cam grooves 10. A drive gear 11 is mounted on the shoulder of the drive ring 3.

The front group moving frame 4 is slidably fitted in the outer cylinder 2 as was described above, and supports a front frame 13 in which a front group lens 12 is fitted. Two roller shaft mounting holes are cut in the front group moving frame 4 in such a manner that they are diametrically opposed to each other, and the roller shafts 14 are embedded in these holes. The roller shafts 14 are secured to the front group moving frame 4 with nuts 15, and are each fitted with rollers 16. Each roller 16 is engaged with the respective front group straight groove 6 in the outer cylinder and the respective front group moving cam 9 in the drive ring 3.

The rear group moving frame 5 is slidably fitted in the outer cylinder 2 as described before, and supports a rear group front frame 18 in which a rear group front lens 17 is fitted and a rear group rear frame 20 in which a rear group rear lens 19 is fitted. Two roller shaft mounting holes are cut in the rear group moving frame 5 in such a manner that they are diametrically opposed to each other, and roller shafts 21 are embedded in these holes. The roller shafts 21 are fixedly secured to the rear group moving frame 5 with nuts 22 and are each fitted with rollers 23. Each roller 23 is engaged with a respective rear group straight groove 7 of the outer cylinder 2 and a respective rear group moving cam groove 10 of the drive ring 3.

An opening and closing ring 24 and a supporting ring 25 are fitted in the rear group moving frame 5. More specifically, the ring 24 is disposed between the ring 25 and the frame 5, so that the movement of the ring 24 in the axial direction of the lens is inhibited, but the ring 24 is rotatable in the frame 5. The ring 24 has grooves the number of which is equal to the number of aperture blades 26. One of two dowel pins 27 embedded in each aperture blade 26 is engaged with each groove. An aperture correcting pin 28 is embedded in the opening and closing ring 24. The pin 28 is protruded through a window formed in the rear group moving frame 5 and is engaged with the aperture diameter correcting cam groove 8 of the outer cylinder 2, so that the opening and closing ring 24 is turned as much as an angle of displacement of the aperture-diameter-correcting cam groove 8 as the rear group moving frame 5 is moved in the optical axis direction. The supporting ring 25 is secured in place to the rear group moving frame 5 with screws (not shown) and has supporting holes the number of which is equal to the number of aperture blades 26. The other dowel pin 27 embedded in each aperture blade 26 is rotatably fitted in a respective one of said holes.

The aperture blades 26 are disposed between the opening and closing ring 24 and the supporting ring 25, and the aperture dowel pins 27 embedded in the aperture blades are inserted in the grooves of the ring 24 and the supporting holes of the supporting ring 25 as described above. Since the dowel pins on opposite sides of each blade are not aligned, the blades will pivot about the pins 27 inserted into the holes in the ring 25, and the aperture blades 26 are opened or closed as the opening and closing ring 24 is turned.

A drive pinion 29 is rotatably mounted on the aforementioned gear shaft 30, but its movement in the direction of thrust, i.e. in the axial direction of the lens, is inhibited. The drive pinion 29 is engaged with the drive gear 11 provided on the drive ring 3.

When a signal for changing the image size of an original to be transmitted is received, a drive section (not shown) applies a signal to the drive pinion 29 to turn the latter 29 through a predetermined amount. The rotation of the drive pinion 29 is transmitted to the drive gear 11, to turn the drive ring 3. The front group moving frame 4 and the rear group moving frame 5 are axially moved, by an amount corresponding to the angular displacement of the drive ring, by the rollers engaged with the front group moving cam grooves 9 and the rear group moving cam grooves 10 of the drive ring 3. As a result, the aperture diameter is changing as the image size is changed.

Either of the two following conditions can be adhered to in increasing or decreasing the aperture diameter when the zooming operation is performed:

$$F_\infty \left( 1 + \frac{m}{\phi} \right) = \text{constant} \quad (a)$$

$$F_\infty m \left( 1 + \frac{m}{\phi} \right) = \text{constant} \quad (b)$$

where $F_\infty$ is the F number when an object is at an infinite distance, m is the lateral magnification, m being larger than zero (m>0), and $\phi$ is the pupil magnification. The condition (a) concerns F numbers effective when an object is at a finite distance, and is to make the intensity of illumination of the sensor constant. In this case, in order to make constant the optical energy received by the sensor, the main scanning time intervals (e.g., the intervals between consecutive samples along a row) should be made constant; however, the auxiliary scanning speed (or the original feeding speed corresponding to the indexing of the scan from one row to the next) must be proportional to 1/m. In contrast to the condition (a), the condition (b) is to make the auxiliary scanning speed constant to thereby make constant the optical energy received by the The conditions (a) and (b) will be described with reference to FIG. 3.

Figure 3:
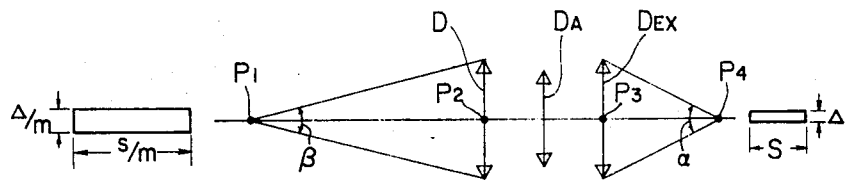
FIG. 3 is an explanatory diagram for a description of the conditions for increasing or decreasing the aperture diameter of the zoom lens according to the invention.
Figure 4:
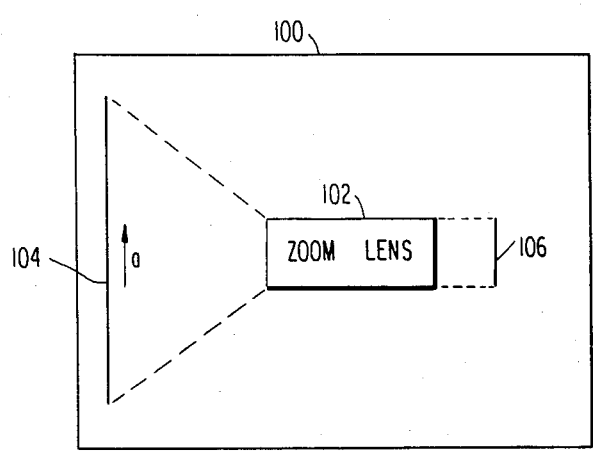
FIG. 4 is an illustrative diagram of an otherwise conventional apparatus in which the present invention is to be employed.

In FIG. 3, reference character $P_1$ designates the position of an original; $P_2$, the position of an entrance pupil; $P_3$, the position of an exit pupil; $P_4$, the position of a sensor; D, the diameter of the entrance pupil; $D_A$, an aperture diameter; $D_{EX}$, the diameter of the exit pupil ($D_{EX}=\phi D$); $\beta$, an angular aperture on the entrance side; $\alpha$, an angular aperture on the exit side; S, the horizontal width of the sensor; and $\Delta$, the vertical width of the sensor.

Further in FIG. 3, the distance between $P_1$ and $P_2$ and the distance between $P_3$ and $P_4$ are defined by:

$$\overline{P_1P_2} = f\left(\frac{1}{\phi} + \frac{1}{m}\right), \text{ and } \overline{P_3P_4} = f(\phi + m)$$

where f is the focal length, $\phi$ is the pupil magnification, and m is the lateral magnification. With respect to the condition (a), in order to make constant the intensity of illumination on the sensor surface, an area of the original equivalent to the area of the sensor surface should apply a constant energy to the entrance pupil.

Since the intensity of illumination of the original is uniform, the energy which the unitary area of the original applies to the entrance pupil is proportional to the square of the angular aperture $\beta$ (i.e. $\beta^2$). Therefore, by making constant the product of $\beta^2$ and $\Delta S/m^2$ representing the area of the original, the energy applied to the entrance pupil is made constant, and accordingly the intensity of illumination of the sensor can be made constant.

$$\beta = \frac{D}{f\left(\frac{1}{\phi} + \frac{1}{m}\right)}$$

$$\beta^2 \Delta S/m^2 = \frac{D^2 \Delta S}{f^2 m^2 \left(\frac{1}{\phi} + \frac{1}{m}\right)^2}$$

$$= \frac{\Delta S}{\left(\frac{f}{D}\right)^2 \left(1 + \frac{m}{\phi}\right)^2} = \text{constant}$$

Therefore, $$F_\infty \left(1 + \frac{m}{\phi}\right) = \text{constant}$$

This is equivalent to the fact that the angular aperture $\alpha$ on the exit side is made constant.

With respect to the condition (b), since the energy accumulation time of the sensor is proportional to 1/m, the intensity of illumination of the sensor surface must be made proportional to m in order to make constant the optical energy received by the sensor.

$$\frac{D^2 \Delta S}{f^2 m^2 \left(\frac{1}{\phi} + \frac{1}{m}\right)^2} \propto m$$

Therefore, $$F_\infty^2 m \left(1 + \frac{m}{\phi}\right)^2 = \text{constant}$$

$$F_\infty m \left(1 + \frac{m}{\phi}\right) = \text{constant}$$

Accordingly, under the condition (a), the electrical system on the sensor side of the facsimile can be standardized irrespective of the size of the original; and under the condition (b) the auxiliary scanning speed can be made constant. Thus, the mechanism on the side of the original can be considerably simplified.

What is claimed is:

1. In a variable image magnification, line-scanning type facsimile apparatus of the type having a zoom lens with at least one lens movable along an optical axis to vary the image magnification, said zoom lens having a numerical aperture, and a line sensor for receiving light through said zoom lens, the improvement comprising correction means for correcting the numerical aperture of said zoom lens by an amount corresponding to the position of said at least one lens along said optical axis, said correction means adjusting said numerical aperture in accordance with the equation:

$$F_\infty(1+m/\phi)=K$$

where $F_\infty$ is the F number of said zoom lens for an object at an infinite distance, m is the lateral magnification of said zoom lens, m>0, $\phi$ is the pupil magnification of said zoom lens, and K is a constant, thereby maintain substantially constant the optical energy received by said line sensor for a substantially constant main scanning rate and an auxiliary scanning rate proportional to 1/m.

2. A variable image magnification facsimile apparatus as claimed in claim 7, wherein said correction means, comprises:
   a rotatable closing ring;
   a diaphragm having an aperture which varies in accordance with rotation of said closing ring; and
   rotating means for rotating said closing ring in accordance with axial movement of said at least one lens.

3. A variable magnification facsimile apparatus as claimed in claim 2, wherein said closing ring is mounted for axial movement with said at least one lens, and wherein said rotating means comprises:
   first camming surfaces formed in a stationary member and extending at an angle with respect to said optical axis;
   first cam follower means coupled to said closing ring and engaging said camming surfaces.

4. A variable magnification facsimile apparatus as claimed in claim 3, wherein:
   said stationary member comprises a stationary cylinder having an inner surface;
   said at least one lens is mounted on a frame member slidably supported on said inner surface; and
   said lens system further comprises second cam follower members fixed to said frame member and extending outside of said stationary cylinder through grooves formed in said cylinder extending substantially along said optical axis, and a rotatable second cylinder disposed outside of said stationary cylinder and having second camming surfaces in the form of grooves therein extending obliquely with respect to said optical axis, said second cam follower members engaging said obliquely extending grooves;

whereby rotation of said second cylinder will impart axial movement to said frame member, said closing ring will move axially with said frame member, and said closing ring will be rotated by said first cam follower means and camming surfaces.

5. A variable magnification facsimile apparatus as claimed in any one of claims 2-4, wherein said at least one lens comprises first and second lens groups each including at least one lens and said diaphragm aperture is variable in accordance with axial movement of said rear lens group.

* * * * *